United States Patent [19]

McMillan et al.

[11] Patent Number: 5,029,697
[45] Date of Patent: Jul. 9, 1991

[54] CLEAN ROOM CONVEYOR

[75] Inventors: Jack G. McMillan, Merced; Zackary A. Roderick, Santa Cruz, both of Calif.

[73] Assignee: Simplimatic Engineering Company, Lynchburg, Va.

[21] Appl. No.: 382,179

[22] Filed: Jul. 19, 1989

[51] Int. Cl.[5] .............................................. B65G 21/10
[52] U.S. Cl. ............................... 198/860.2; 198/860.1; 198/817
[58] Field of Search ...................... 198/817, 779, 836.1, 198/860.2, 861.1, 860.1, 860.3

[56] References Cited

U.S. PATENT DOCUMENTS

| 2,868,394 | 1/1959 | Greller et al. | |
|---|---|---|---|
| 3,605,994 | 3/1970 | Parlette | |
| 3,666,082 | 5/1972 | Riggs | 198/836.1 X |
| 3,779,368 | 12/1973 | Smith | |
| 3,788,457 | 1/1974 | Valentino, Jr. | 198/836.1 |
| 3,800,938 | 4/1974 | Stone | 198/841 |
| 3,809,207 | 5/1974 | Euverard | |
| 3,825,108 | 7/1974 | Stone | 198/861.1 |
| 4,003,466 | 1/1977 | Muth et al. | |
| 4,030,620 | 6/1977 | Euverard et al. | |
| 4,077,510 | 3/1977 | Mueller | |
| 4,358,010 | 11/1982 | Besch | |
| 4,390,091 | 6/1983 | Gonzalez | |
| 4,484,677 | 11/1984 | Berwald | 198/860.3 X |
| 4,501,353 | 2/1985 | Burkhardt | |
| 4,511,031 | 4/1985 | Lachonius | |
| 4,545,477 | 10/1985 | Besch | 198/860.1 X |
| 4,556,143 | 12/1983 | Johnson | 198/817 X |
| 4,576,277 | 3/1986 | Park et al. | |
| 4,658,952 | 4/1987 | Grundken et al. | 198/860.3 X |
| 4,684,011 | 8/1987 | Schneider | |
| 4,930,623 | 6/1990 | Johnson et al. | 198/861.1 X |

FOREIGN PATENT DOCUMENTS

| 0017637 | 10/1980 | European Pat. Off. | |
|---|---|---|---|
| 3537135 | 4/1987 | Fed. Rep. of Germany | 198/860.3 |
| 1201830 | 1/1960 | France | |
| 0075714 | 4/1986 | Japan | 198/860.3 |
| 61-75714 | 4/1986 | Japan | |
| 2108459 | 5/1983 | United Kingdom | |
| 2160489 | 12/1985 | United Kingdom | 198/860.3 |
| 2167371 | 5/1986 | United Kingdom | |
| 2198107 | 6/1988 | United Kingdom | 198/860.2 |

Primary Examiner—Robert P. Olszewski
Assistant Examiner—James R. Bidwell
Attorney, Agent, or Firm—St.Onge Steward Johnston & Reens

[57] ABSTRACT

A conveyor is provided comprising an endless conveyor chain, a plurality of spacers, and at least two conveyor supports mounted on opposite sides of the spacers to permit air to freely flow therethrough. Each conveyor support comprises at least one elongate member mounted to any of a second plurality of spacers and any other elongate members to permit air to freely flow therethrough as well. Further, each elongate member has both inner and outer surfaces, and both top and bottom edges adapted to support the endless rolling conveyor chain from below. The inner surfaces of the elongate members are sloped and the outer surfaces of the elongate members are preferably substantially vertical to enhance downward movement of particulates. The top and bottom edges of the elongate members preferably include UHMW wearstrips to reduce friction. The conveyor may include guide rails to guide articles being transported along the conveyor, and a stop mechanism for stopping articles being transported at a predetermined position along the conveyor.

39 Claims, 4 Drawing Sheets

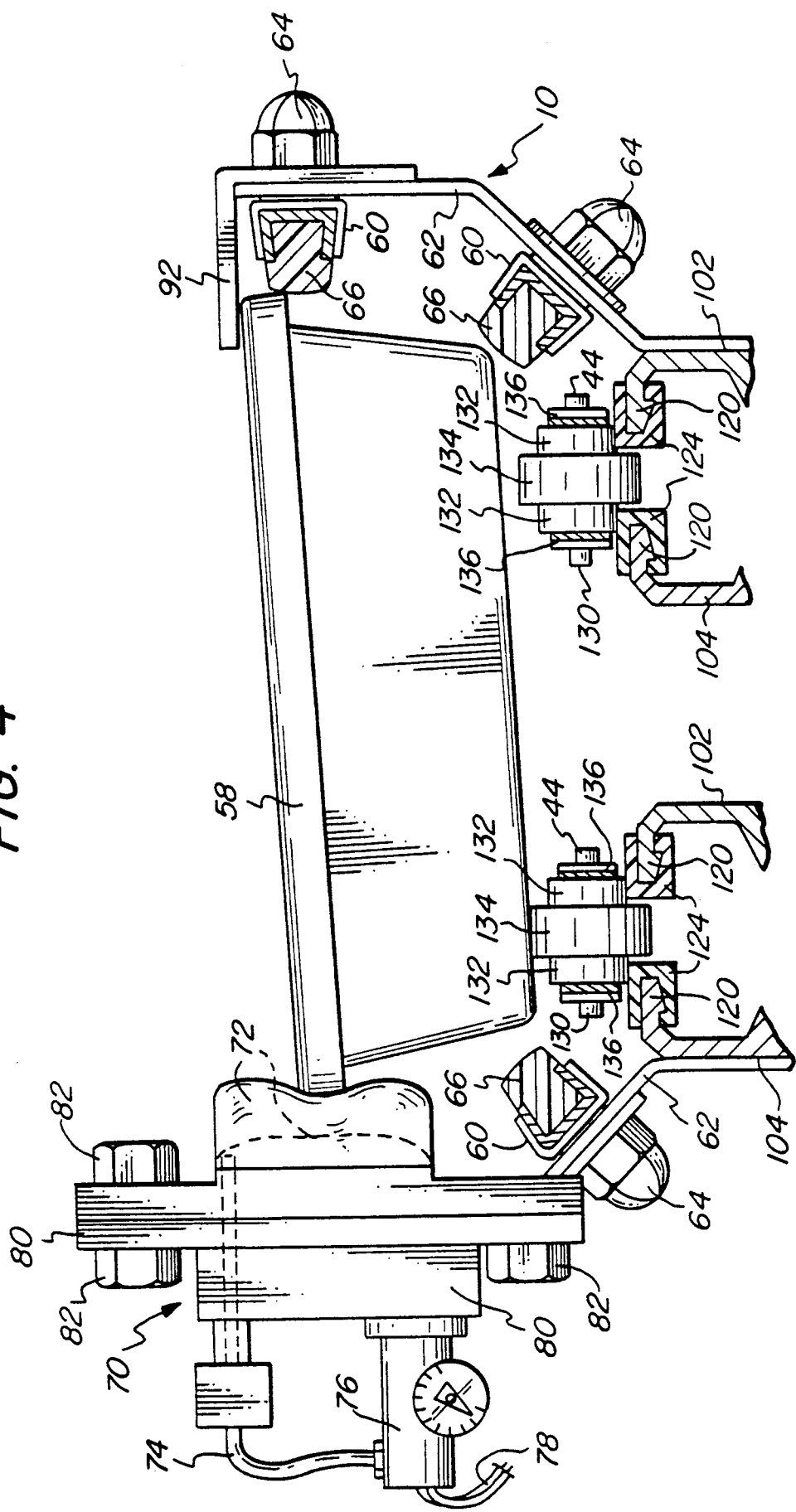

CLEAN ROOM CONVEYOR

FIELD OF THE INVENTION

This invention relates to conveyors, and more particularly to low-friction conveyor systems.

BACKGROUND ART

Low friction conveyor systems find a variety of uses in applications requiring "clean" environments such as, for example, food, drug, and electronics processing. These applications may require environments free from lubricants, abraded particulates, dust, or other contaminants. Prior art conveyors include a variety of designs for extending useful life and providing a "clean" work environment by reducing wear due to friction.

The following prior art is described by way of example only as many low-friction conveyor systems are known and used.

U.S. Pat. No. 4,501,353 to Burkhardt discloses a chain conveyor including chain rollers and carrier rollers. Chain rollers are located on either side of carrier rollers, and ride down runner tracks. Carrier rollers rotate relative to the chain rollers and support an article to be conveyed. The rollers function cooperably to reduce wear in both conveying and accumulating modes of operation.

U.S. Pat. No. 4,576,277 to Park et al. discloses a clean, low-friction, long-lasting, plastic-to-plastic conveyor having removable replaceable wear members. The members are located both on a conveyor framework and on a conveyor belt.

SUMMARY OF THE INVENTION

Despite a variety of low-friction prior art devices as illustrated above, none is particularly adapted for use in clean rooms. Conveyor systems for use in clean rooms should not only not generate contaminants by frictional wear or otherwise, but also should minimize horizontal or other surfaces which may collect particulates and/or contaminants. Clean rooms typically incorporate a flow of air from ceiling to floor which is designed to carry away airborne particles and contaminants. Ideally, then, clean room conveyors should also permit air to flow therethrough from top to bottom.

It is an object of this invention to provide a conveyor suitable for use in clean rooms. It is another object of this invention to provide a low-friction conveyer which minimizes the particulate contaminants generated thereby. It is still another object of this invention to provide a conveyor which has a minimal number of horizontal surfaces. It is yet another object of this invention to provide a conveyor through which air freely flows from top to bottom.

This invention relates to low-friction conveyor systems for use in clean rooms. The conveyor comprises an endless conveyor chain, a plurality of spacers, and at least two conveyor supports mounted on opposite sides of the spacers to permit air to freely flow therethrough. The endless conveyor chain preferably includes rollers formed from ultra high molecular weight (UHMW) plastic. If conveying electrically sensitive articles, the rollers may include between about 3% and about 8% carbon by weight to drain away any electrical charge in the article. Each conveyor support comprises at least one elongate member mounted to any of a second plurality of spacers and any other elongate members to permit air to freely flow therethrough as well.

Further, each elongate member has both inner and outer surfaces, and both top and bottom edges adapted, and preferably bent inwardly with rounded corners minimizing any horizontal surfaces, to support the endless rolling conveyor chain from below. Each elongate member may also include a substantially vertical body and a mounting platform spaced from the inner surface of the substantially vertical body by sloping walls. The inner surfaces of the elongate members are sloped by the sloping walls, and preferably sloped at least about 20° as measured from the horizontal, to minimize any horizontal surfaces which might collect contaminants while accommodating passage of the endless conveyor chain. The outer surfaces of the elongate members are preferably substantially vertical to minimize the incidence of contaminants settling thereon. The top and bottom edges of the elongate members preferably include UHMW wearstrips to reduce friction which might cause particulate contaminants.

The conveyor may include guide rails to guide articles being transported along the conveyor, and a stop mechanism for stopping articles being transported at a predetermined position along the conveyor. The guide rails preferably include UHMW wearstrips to reduce friction which might cause particulate contaminants. The stop mechanism includes a sensor, an inflatable bladder, and a retaining bar to prevent the article being transported from being pressed off the conveyor by the inflatable bladder when inflated.

These and other advantages of the invention will become more apparent from the following detailed description when considered with reference to the accompanying drawings.

BRIEF DESCRIPTION OF THE DRAWINGS

FIG. 4 is partial cross-sectional view of the conveyor of FIG. 1 revealing how the stop mechanism function.

DETAILED DESCRIPTION

Figure 1:
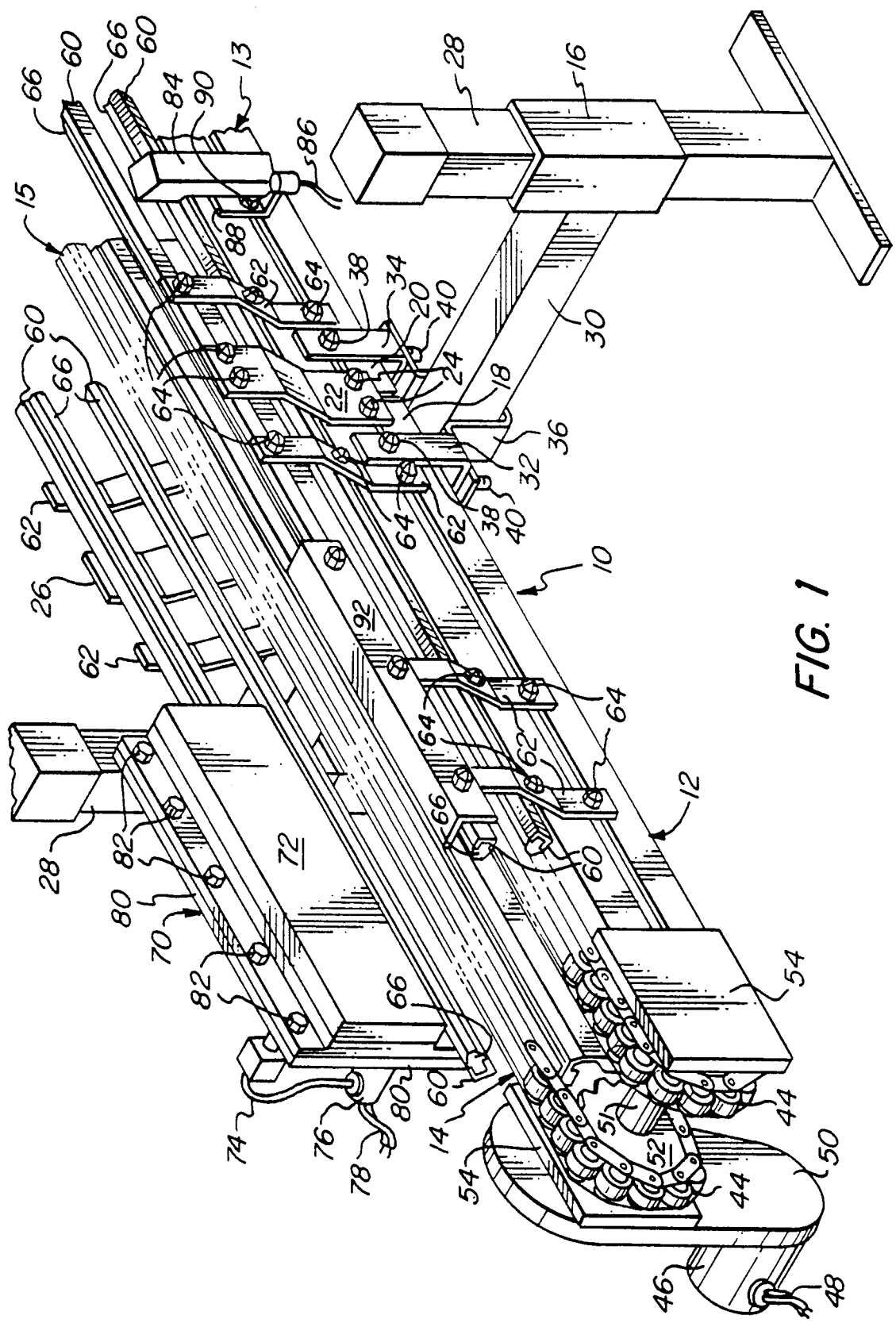
FIG. 1 is a perspective view of a conveyor in accordance with this invention.

Referring now to FIG. 1, a conveyor 10 in accordance with this invention generally is shown. As illustrated, conveyor 10 includes four conveyor supports 12, 13, 14, and 15 mounted to adjustable stand or base 16. Conveyor supports 12 and 13 are joined at their abutting ends 18 and 20 by joining bracket 22 with fasteners 24. A joining bracket 26 functions in the same manner to join conveyor supports 14 and 15 although not visible in this view. Four conveyor supports are shown in conveyor 10 of this Figure but any number may be used to construct a conveyor of the desired length and also width as three or more lengths of conveyor supports may be used in a single conveyor.

Adjustable stands 16 include vertical posts 28 and cross bars 30 which may be vertically adjusted along posts 28. Conveyor supports are mounted to crossbars 30 with three substantially U-shaped brackets 32, 34, and 36. Brackets 32 and 34 are mounted to the conveyor support(s) with fasteners 38 and bracket 36 is attached to brackets 32 and 34 with fasteners 40 to clamp the conveyor support(s) to crossbar 30. As illustrated, brackets 32 and 34 are mounted to ends 18 and 20 of respective conveyor supports 12 and 13. While this is a preferred location for adjustable stand 16 because it supports two conveyor supports and strengthens the joint therebetween, the adjustable stands may be located anywhere along the conveyor supports.

Conveyor supports 12, 13, 14, and 15 guide an endless rolling conveyor chain 44 which is circulated by a motor 46 which is activated via line 48. Motor 46 in conjunction with a gear box chain guard 50 rotates an axle 51 and attached sprockets 52 (only one of which is visible in this view). Axled sprockets 52 are mounted beyond the ends of conveyor supports 12 and 14 with plates 54. Although not shown in this view axled sprockets are similarly mounted at the opposite ends of conveyor 10 to complete circulation of endless conveyor chain 44.

Guide rails 60 are fastened to mounting brackets 62 with fasteners 64. Mounting brackets 64 are mounted, in turn, to conveyor supports with fasteners 64 as well. Joining brackets 22 and 26 also serve to support guide rails 60 with fasteners 64. Two guide rails 60 are preferably used on either side of conveyor 10, but any number necessary for the article being transported may be used. Further, guide rails 60 preferably include removable replaceable wear strips 66 which may be made from ultra high molecular weight (UHMW) plastics such a polyethylene. Wearstrips 66 reduce the incidence of abraded particulate containments which may otherwise be produced by contact between an article 58 (not shown in this view) being transported and guide rails 60.

Conveyor 10 includes a stop mechanism 70 for stopping article 58 at a predetermined location or workstation. Stop mechanism 70 comprises an inflatable bladder 72 which may be inflated through fluid line 74 with pump 76. In turn, pump 76 is actuated via line 78. Inflatable bladder 72 and pump 76 are mounted to a plate 80, similar to mounting brackets 62 for guide rails 60, with fasteners 82.

In operation, a sensor 84 signals along line 86 when it senses that an article 58 being conveyed (not shown in this view) is approaching the predetermined location. Sensor 84 may be attached anywhere along the conveyor support with an accessory rack 88 and a fastener 90. Once an article is sensed as approaching, pump 76 is actuated via line 78 and inflatable bladder 72 is inflated along line 74 to press article 58 against retaining bar 92 mounted to the upper guide rail opposite the inflatable bladder, thereby stopping the article at the predetermined location. Additional features of the stop mechanism including an article shown stopped at the predetermined location are discussed below with reference to FIG. 4.

Figure 2:
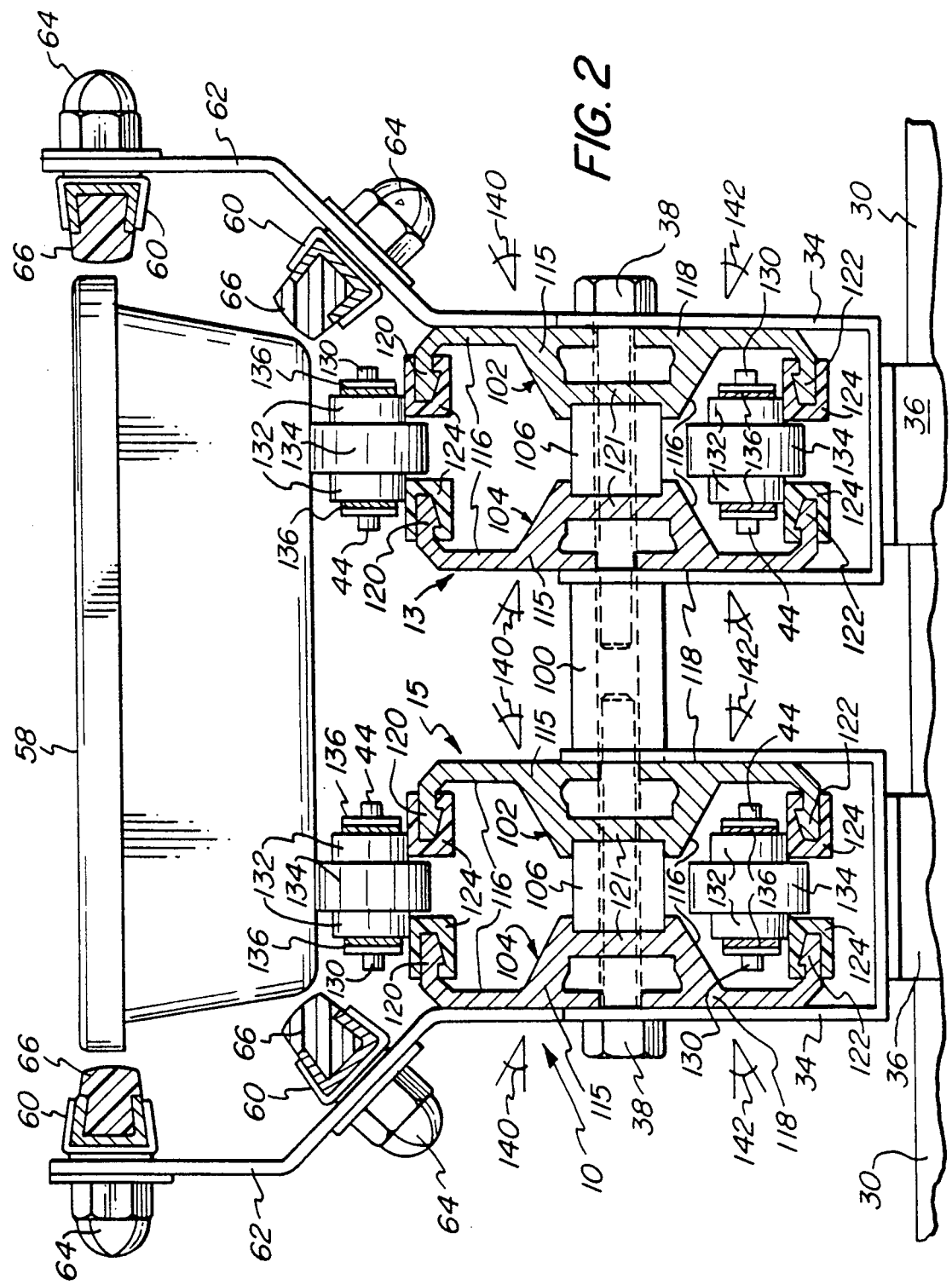
FIG. 2 is an end view of two conveyor supports, disassembled from the conveyor of FIG. 1 and omitting the sensor, which reveals additional detail of the conveyor supports.

Referring now to FIG. 2, an end view of conveyor supports 13 and 15, disassembled from conveyor 10 and omitting sensor 84, reveals additional detail. Conveyor supports 13 and 15 are mounted together along their length on opposite sides of a plurality of spacers 100. Fasteners 38 extend through the conveyor supports and into the sides of spacers 100. Spacers 100 are preferably cylindrically shaped and sized only slightly larger than fasteners 38 to minimize any horizontal surfaces which might collect dust or other particulate contaminants. Spacers 100 may be of any length necessary to accommodate the article to be transported. By mounting the conveyor supports in this manner, air is free to flow between the conveyor supports and around the spacers and carry away contaminants which might otherwise settle on or in the conveyor.

Each of the conveyor supports, including conveyor supports 12 and 14 not shown in this Figure, preferably comprises at least two elongate members 102, and 104, and a plurality of spacers 106. Elongate members 102 and 104 are mounted together along their lengths on opposite sides of spacers 106. Fasteners 38 extend through each spacer from side to side and through both elongate members to form a conveyor support. Spacers 106 are preferably cylindrically shaped and sized only slightly larger than fasteners 38 to minimize any horizontal surfaces which might collect dust or other particulate contaminants. Spacers 106 may be of any length necessary to accommodate endless conveyor chain 44.

Each elongate member, including those which make conveyor supports 12 and 14, comprises a substantially vertical body 115, an inner surface 116 and an outer surface 118, a top edge 120 and a bottom edge 122, and a mounting platform 121 located substantially between the top and bottom edges. Although the elongate members are shown in left and right hand orientation in the Figure, the discussion of a single elongate member describes all elongate members since they are freely interchangeable. The right and left handedness of the elongate members applies only when they are mounted together, with their inside edges facing each other, to form a conveyor support. Further, the top and bottom edges of an elongate member are preferably freely interchangeable as described in more detail below.

As mounted together to form a conveyor support, top and bottom edges 120 and 122 of both elongate members 102 and 104 are all bent inwardly toward the inside surfaces 116 of the opposite elongate members to support and guide endless conveyor chain 44 from below. Top and bottom edges 120 and 122 preferably include removable replaceable wearstrips 124 which may be made from UHMW plastics such a polyethylene. Wearstrips 124 reduce the incidence of abraded particulate contaminants which may otherwise be produced by contact between endless conveyor chain 44 and elongate members ends 120 and 122.

Each link of endless conveyor chain 44 preferably comprises an axle 130, a pair of conveying rollers 132, a carrier roller 134, and a pair of connectors 136 mounted one each on opposite sides of each link for combining adjacent links. The adjacent link include spaces therebetween to permit air to freely flow therethrough and carry away contaminants which might otherwise settle on the conveyor. All three rollers share an axis common with axle 130. Carrier roller 134, however, may rotate independently and in a direction opposite that of conveying rollers 132 when for example articles 58 are accumulating. In this regard, carrier rollers 134 preferably have a slightly larger diameter than conveying rollers 136 enabling carrier rollers 134 to contact articles 58 while conveying rollers 132 cannot. Further, the width of carrier rollers 134 preferably is selected in combination with the length of spacers 106 such that carrier rollers 134 may be accommodated, between top and bottom edges 120 and 122 including wearstrips 124. ConVeying rollers 132 may be of any width necessary to suspend carrier roller 134 between the bent edges.

All thee rollers are preferably made from UHMW plastics such as polyethylene. The conveying combination of UHMW plastic endless rolling conveyor chain 44 and UHMW plastic wearstrips 124 reduces friction and thus the incidence of abraded particulate contaminants. Finally, when conveying electrically sensitive apparatus, the rollers may include between about 3% and about 8%, and preferably about 5% carbon weight to drain away any electrical charge.

Outer surfaces 118 of elongate members 102 and 104 are preferably substantially vertical to minimize the risk of contaminants settling thereon and enhance their downward flow. Inner surfaces 116 of elongate members 102 and 104 slope at least 20° from the horizontal to minimize any horizontal surfaces which might collect contaminants. By sloping the inner surfaces at least 20°, applicants have found that the flow of air from ceiling to floor as in a clean room effectively carries away airborne particles and/or contaminants.

At least some portion of the inner surfaces between spacers 106 and top edges 120 preferably slope between about 20° to about 40° as indicated at 140. Also at least some portion of the inner surfaces between spacers 106 and bottom edges 122 preferably slope between about 20° to about 40° as indicated at 142. Sloping the inner surfaces from the spacers to the bottom edges is preferred because it enables elongate members to be reversible top to bottom. Further, sloping at least some portion of the inner surfaces from the spacers to the bottom edges less than or equal to about 40° strikes a balance which minimizes the overall size of the elongate member necessary to accommodate passage of the endless conveyor chain while maximizing its contaminant and/or particulate repelling capabilities. Remaining portions of inner surfaces 116 are preferably substantially vertical to enhance the downward flow of particles and other contaminants.

Figure 3:
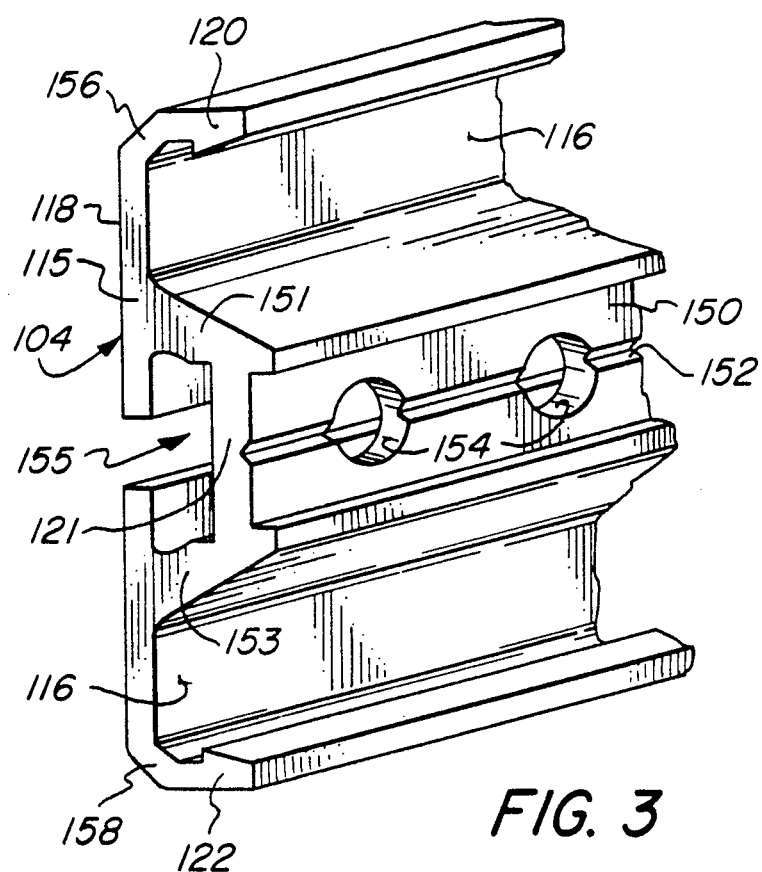
FIG. 3 is a perspective view of an elongate member of the conveyor support of FIG. 2.

FIG. 3 is a perspective view of left elongate member 104, revealing additional detail. Again, the following description is equally applicable to right elongate member 102 since they are freely interchangeable. Elongate members 102 and 104 may be made from plastic, fiberglass, and preferably metal. Most preferably they are made from black anodized aluminum. Further, the elongate members may be machined, molded, and preferably extruded.

Mounting platform 121 of elongate member 104 includes a substantially vertical track 150 for mounting spacers 106 (not shown in this Figure). Track 150 is elevated from inner surface 116 by sloping walls 151 and 153 which extend from the inner surface and, as discussed above with reference to FIG. 2, preferably slope between about 20° and about 40°. Track 150 comprises a V-shaped groove 152 for locating fastener holes 154 over which spacers 106 are placed to form a conveyor support from two or more elongate members. In this regard, fasteners 38 (not shown in this view) pass from outer surface 118, through a slot 155, hole 154, and into spacer 106 (also not shown in this view). Slot 155 is preferably located directly adjacent mounting platform 121 and serves to make elongate members lighter and more economical. Preferably, elongate member 104 is a mirror image top and bottom from V-shaped groove 152. This enables top edges 120 to be freely interchangeable with bottom edges 122 of the elongate member. In this regard, a single extrusion includes and can be arranged to utilize top and bottom edges of both right and left elongate members. The advantages of such right to left and top to bottom interchangeability include increased practicality and economy.

Holes 154 are shown much closer together in this view than they need to be in a conveyor support for the sake of example. By spreading the holes and thus the spacers, air may freely flow between the elongate members and around the spacers to carry away airborne contaminants which might otherwise settle on or in the conveyor. Conveyor 10 is adapted to use in applications requiring "clean" environments such as food, drug, and electronics processing where particulate and other contaminants are unwanted. In this regard, conveyor 10 is particularly adapted for use in environments where there is a continuous flow of air to carry away contaminants and is most particularly adapted for use in clean rooms where, for example, a continuous flow of air from ceiling to floor is free to pass through not only conveyor 10, but also through the endless conveyor chains and the conveyor supports themselves to whisk away contaminants. In this regard, any component and the complete conveyer is designed to enhance the downward flow of air which in a clean room carries away contaminants.

Bent edges 120 and 122 preferably include respective rounded corners 156 and 158 to further minimize any horizontal surfaces which might otherwise collect contaminants. In conjunction with the flow of air in a clean room, the rounded corners of the elongate members' bent edges effectively minimize the collection of contaminants.

Referring now to FIG. 4, a partial cross-sectional view of conveyor 10 shows stop mechanism 70 actuated to stop article 58 at the predetermined position. Inflatable bladder 72 is shown in its uninflated state in dashed lines. Retaining bar 92 functions to prevent article 58 from being pressed off of conveyor 10 by inflatable bladder 72. When article 58 is stopped as shown, or accumulating such as at the end of conveyor 10 or behind another stopped article, carrier rollers 134 rotate in the opposite direction of conveying rollers 132 to further reduce friction and thus wear between endless rolling conveyor chain 44 and article 58 which may otherwise produce particulate contaminants. Article 58 is illustrated as a tray, but may also be either a pallet or a workpiece itself.

The above description is not meant to describe in detail each and every modification and variation which will be apparent to a person skilled in the art.

What is claimed is:

1. A conveyor support for conveyors having endless conveyor chains to transport articles, the conveyor support comprising:

a plurality of spacers;

right and left elongate members, each elongate member having an inner surface and an outer surface, and each having top and bottom edges adapted to support the endless conveyor chain from below; and means for fastening the elongate members together along their length on opposite sides of each of the plurality of spacers such that the inner surfaces of said elongate members face each other to bring the top and bottom edges together at a distance to support the endless conveyor chain while permitting the free flow of air between the top and bottom edges and around the spacers;

the inner surfaces of said elongate members sloping from their top edges toward the plurality of spacers to minimize any horizontal surfaces which might collect contaminants, and wherein the outer surfaces of said elongate members are substantially vertical to minimize the incidence of contaminants settling thereon, and wherein the inner surfaces of said elongate members slope at least 20° as measured from the horizontal to minimize the incidence of contaminants settling thereon.

2. The conveyor support of claim 1 wherein at least a portion of the inner surfaces of said elongate members slope between about 20° and about 40° as measured from the horizontal to minimize the overall size of the elongate members.

3. The conveyor support of claim 1 wherein there are provided rollers for the endless conveyor chain which include at least about 3% by weight of carbon to drain any electrical charge away from the transported articles.

4. The conveyor support of claim 1 wherein there are provided rollers for the endless conveyor chain which include between about 3% and about 8% by weight of carbon to drain any electrical charge away from the transported articles.

5. The conveyor support of claim 1 wherein the inner surfaces of said elongate members also slope from the plurality of spacers toward their bottom edges to make the elongate members interchangeable from top to bottom while minimizing any horizontal surfaces which might collect contaminants.

6. The conveyor support of claim 1 wherein the inner surfaces of said elongate members slope between about 20° and about 40° from the plurality of spacers toward their bottom edges to minimize the overall size of the elongate members while accommodating passage of the endless conveyor chain.

7. The conveyor support of claims 1 or 5 wherein each elongate member is an integral extrusion.

8. A conveyor having endless rolling conveyor chains for transporting articles comprising:
 a first plurality of spacers;
 at least two conveyor supports, each conveyor support comprising
  a second plurality of spacers,
  at least two elongate members, each elongate member having an inner surface and an outer surface, and each having top and bottom edges adapted to support the endless rolling conveyor chain from below, and
  means for fastening the elongate members together along their length on opposite sides of each of the second plurality of spacers such that the inner surfaces of said elongate members face each other to bring the top and bottom edges together at a distance to support the endless rolling conveyor chain while permitting the free flow of air between the top and bottom edges and around the second plurality of spacers,
 the inner surfaces of said elongate members are sloped from their top edges toward the plurality of spacers to prevent contaminants from settling thereon;
 the outer surfaces of said elongate members are substantially vertical to minimize the incidence of contaminants settling thereon;
 said means for fastening also for fastening the conveyor supports together along their length on opposite sides of each of the first plurality of spacers to support the article to be transported with the endless rolling conveyor chain from below while permitting the free flow of air between the conveyor supports and around the first plurality of spacers,
 and wherein at least a portion of the inner surfaces of said elongate members slope between about 20° and about 40° as measured from the horizontal to accommodate passage of the endless rolling conveyor chain above the edges of said elongate members and below the second plurality of spacers.

9. The conveyor of claim 8 comprising guide rails mounted to the outermost surfaces of the outermost conveyor supports for guiding the articles to be transported along the conveyor, the guide rails including removable replaceable wearstrips to reduce any particulate contaminants produced by wear due to friction between the guide rails and the articles.

10. The conveyor of claim 8 wherein the outer surfaces of said elongate members are substantially vertical to prevent contaminants from settling thereon.

11. The conveyor of claim 8 wherein the inner surfaces of said elongate members slope at least 20° as measured from the horizontal enabling the flow of air between the top and bottom edges of the elongate members to carry away any airborne particles and contaminants which might otherwise settle thereon.

12. The conveyor of claim 8 wherein the top and bottom edges of the elongate members include removable replaceable wearstrips to reduce any particulate contaminants produced by wear due to friction between the endless rolling conveyor chain and the elongate members.

13. The conveyor of claim 8 wherein rollers for the endless rolling conveyor chain include at least about 3% by weight of carbon to drain any electrical charge away from the transported articles.

14. The conveyor of claim 8 wherein the inner surfaces of said elongate members also slope from the plurality of spacers toward their bottom edges to make the elongate members interchangeable from top to bottom.

15. The conveyor of claims 8 or 12 wherein the top and bottom edges of said elongate members are each bent inwardly toward the inner surfaces of the opposite elongate member to support the endless rolling conveyor chain from below.

16. The conveyor support of claims 8 or 14 wherein each elongate member is an integral extrusion which is freely interchangeable right to left and top to bottom.

17. An extruded member for mounting together with any spacers and any other extruded members to support both a conveying portion and a returning portion of an endless conveyor chain from below forming a conveyor, the extruded member comprising:
 a substantially vertical body having an inner surface and an outer surface, and having a top edge and a bottom edge;
 a first substantially horizontal track formed with rounded corners from the top edge and toward the inner surface of said substantially vertical body to support the conveying portion of the endless conveyor chain from below;
 a second substantially horizontal track formed with rounded corners from the bottom edge and toward the inner surface of said substantially vertical body to support the returning portion of the endless conveyor chain from below; and
 a mounting platform located substantially between the top and bottom edges of the substantially vertical body for mounting to form a conveyor, the mounting platform comprising sloping walls extending from the substantially vertical body on its inner surface for sloping at least a portion of the inner surface from between both the top edge toward the mounting platform and the mounting platform toward the bottom edge at least about 20° as measured from the horizontal to minimize any horizontal surfaces which might collect contaminants while making the elongate members mirror-image identical and thus interchangeable from top to bottom, and a substantially vertical track spaced from and connected to the substantially vertical body at its inner surface by said sloping walls, said track for receiving any spacers and any other extruded members to form a conveyor.

18. The extruded member of claim 17 wherein the sloping walls slope at least a portion of the inner surface of said substantially vertical body from between both the top edge toward the mounting platform and the mounting platform toward the bottom edge between about 20° and about 40° to minimize the overall size of the extruded member while accommodating passage of the returning portion of the endless conveyor chain above an edge of said substantially vertical body and below the mounting platform of the extruded member.

19. The extruded member of claim 17 wherein the first and second horizontal tracks comprise removable replaceable wearstrips of UHMW plastic to reduce the incidence of abraded particulates which might otherwise be caused by wear due to friction between said tracks and the endless conveyor chain.

20. The extruded member of claim 17 further comprising a slot in said outer surface located beneath said mounting platform to reduce the amount of material in said extruded member making it both lighter and more economical.

21. The extruded member of claim 17 is formed substantially from aluminum.

22. The extruded member of claim 17 wherein the outer surface is substantially vertical to minimize the incidence of contaminants settling thereon and enhance the downward flow of particles and contaminants.

23. The extruded member of claim 17 wherein other portions of the inner surface of said substantially vertical body are substantially vertical to minimize the incidence of contaminants settling thereon and enhance the downward flow of particles and contaminants.

24. A conveyor support for conveyors having endless conveyor chains to transport articles, the conveyor support comprising:

a plurality of spacers;

right and left elongate members, each elongate member having an inner surface and an outer surface, and each having top and bottom edges adapted to support the endless conveyor chain from below; and means for fastening the elongate members together along their length on opposite sides of each of the plurality of spacers such that the inner surfaces of said elongate members face each other to bring the top and bottom edges together at a distance to support the endless conveyor chain while permitting the free flow of air between the top and bottom edges and around the spacers;

the inner surfaces of said elongate members sloping from their top edges toward the plurality of spacers to minimize any horizontal surfaces which might collect contaminants, and wherein the top and bottom edges of said elongate members are each bent inwardly toward the inner surfaces of the opposite elongate member to support the endless conveyor chain from below, and further said edges are bent with rounded corners to minimize any horizontal surfaces.

25. The conveyor support of claim 24 wherein the top and bottom edges of the elongate members include removable replaceable wearstrips to reduce any particulate contaminants produced by wear due to friction between the endless conveyor chain and the elongate members.

26. The conveyor support of claim 24 wherein the inner surfaces of said elongate members also slope from the plurality of spacers toward their bottom edges to make the elongate members interchangeable from top to bottom while minimizing any horizontal surfaces which might collect contaminants.

27. A conveyor support for conveyors having endless conveyor chains to transport articles, the conveyor support comprising:

a plurality of spacers;

right and left elongate members, each elongate member having an inner surface and an outer surface, and each having top and bottom edges adapted to support the endless conveyor chain from below; and means for fastening the elongate members together along their length on opposite sides of each of the plurality of spacers such that the inner surfaces of said elongate members face each other to bring the top and bottom edges together at a distance to support the endless conveyor chain while permitting the free flow of air between the top and bottom edges and around the spacers;

the inner surfaces of said elongate members sloping from their top edges toward the plurality of spacers to minimize any horizontal surfaces which might collect contaminants, and wherein at least a portion of the inner surfaces of said elongate members slope inwardly toward the opposite elongate member at an angle greater than 0° and less than 90° as measured from the horizontal.

28. The conveyor support of claim 27 wherein the inner surfaces of said elongate members also slope from the plurality of spacers toward their bottom edges to make the elongate members interchangeable from top to bottom while minimizing any horizontal surfaces which might collect contaminants.

29. The conveyor support of claim 28 wherein two portions of the inner surfaces of said elongate members slope inwardly toward the opposite elongate member at an angle greater than 0° and less than 90° as measured from the horizontal.

30. The conveyor support of claim 27 wherein the inner surfaces of said elongate members slope inwardly toward the opposite elongate member at an angle greater than 20°.

31. The conveyor support of claim 30 wherein the inner surfaces of said elongate members slope inwardly toward the opposite elongate member at an angle less than 40°.

32. The conveyor support of claim 27 wherein the top and bottom edges of said elongate members are each bent inwardly toward the inner surfaces of the opposite elongate member to support the endless conveyor chain from below, and further said edges are bent with rounded corners to minimize any horizontal surfaces.

33. A conveyor support member for mounting together with spacers and another conveyor support member to support at least a conveying portion of an endless conveyor chain from below forming a conveyor, the conveyor support member comprising:
   a substantially vertical body having an inner surface and an outer surface, and having a top edge and a bottom edge; and
   a mounting platform located substantially between the top and bottom edges of the substantially vertical body for mounting to form a conveyor, the mounting platform comprising
      sloping walls extending from the substantially vertical body on its inner surface for sloping from between both the top edge toward the mounting platform and the mounting platform toward the bottom edge at least about 20° as measured from the horizontal to minimize any horizontal surfaces which might collect contaminants, and
      a substantially vertical track spaced from and connected to the substantially vertical body at its inner surface by said sloping walls, said track for receiving the spacers and the other conveyor support member to form a conveyor.

34. The conveyor support member of claim 33 wherein the sloping walls slope along at least a portion of the inner surface of said substantially vertical body from between both the top edge toward the mounting platform and the mounting platform toward the bottom edge between about 20° and about 40° to minimize the overall size of the extruded member while accommodating passage of a returning portion of the endless conveyor chain above an edge of said substantially vertical body and below the mounting platform of the extruded member.

35. The conveyor support member of claim 34 wherein other portions of the inner surface of said substantially vertical body are substantially vertical to minimize the incidence of contaminants settling thereon and enhance the downward flow of particles and contaminants.

36. The conveyor of claim 33 wherein the top and bottom edges of said elongate members are each bent inwardly toward the inner surfaces of the opposite elongate member to support the endless conveyor chain from below.

37. A conveyor support member for mounting together with spacers and another conveyor support member to support both a conveying portion and a returning portion of an endless conveyor chain forming a conveyor, the conveyor support member comprising:
   a substantially vertical body having an inner surface and an outer surface, and having a top edge and a bottom edge;
   a first substantially horizontal track formed with rounded corners from the top edge and toward the inner surface of said substantially vertical body to support the conveying portion of the endless conveyor chain;
   a second substantially horizontal track formed with rounded corners from the bottom edge and toward the inner surface of said substantially vertical body to support the returning portion of the endless conveyor chain; and
   a mounting platform located substantially between the top and bottom edges of the substantially vertical body for mounting to form a conveyor.

38. The conveyor support member of claim 37 wherein said mounting platform comprises:
   sloping walls extending from the substantially vertical body on its inner surface for sloping at least a portion of the inner surface from between both the top edge toward the mounting platform and the mounting platform toward the bottom edge at least about 20° as measured from the horizontal to minimize any horizontal surfaces which might collect contaminants, and
   a substantially vertical track spaced from and connected to the substantially vertical body at its inner surface by said sloping walls, said track for receiving any spacers and any other extruded members to form a conveyor.

39. The conveyor support member of claim 37 wherein the outer surface is substantially vertical to minimize the incidence of contaminants settling thereon and enhance the downward flow of particles and contaminants.

* * * * *